US005233690A

United States Patent [19]

Sherlock et al.

[11] Patent Number: 5,233,690

[45] Date of Patent: Aug. 3, 1993

[54] VIDEO GRAPHICS DISPLAY MEMORY SWIZZLE LOGIC AND EXPANSION CIRCUIT AND METHOD

[75] Inventors: Ian J. Sherlock; Richard D. Simpson, both of Bedford, England

[73] Assignee: Texas Instruments Incorporated, Dallas, Tex.

[21] Appl. No.: 387,568

[22] Filed: Jul. 28, 1989

[51] Int. Cl.[5] .............................................. G06F 12/00

[52] U.S. Cl. .................................. 395/165; 395/164; 340/799

[58] Field of Search ........ 364/518, 521, 200 MS File, 364/900 MS File; 340/799, 798, 802; 395/165, 164, 130, 425

[56] References Cited

U.S. PATENT DOCUMENTS

| | | | |
|---|---|---|---|
| 4,807,189 | 2/1989 | Pinkham et al. | 365/189 |
| 4,823,286 | 4/1989 | Lumelsky et al. | 364/521 |
| 4,845,640 | 7/1989 | Ballard et al. | 364/518 |
| 4,933,879 | 6/1990 | Ando et al. | 364/522 |
| 4,943,937 | 7/1990 | Kasano et al. | 364/521 |
| 4,958,303 | 9/1990 | Assarpour et al. | 364/521 |
| 4,965,751 | 10/1990 | Thayer et al. | 364/521 |

FOREIGN PATENT DOCUMENTS 0071744 2/1983 European Pat. Off. .

WO 88/07235 9/1988 PCT Int'l Appl. .

OTHER PUBLICATIONS

K. Takuji, "Picture Enlarging Device", Matsushita Electric Ind. Co., Ltd., Patent Abstract of Japan, Sep., 5, 1988, Application No. JP860251124.

*Primary Examiner*—Gary V. Harkcom
*Assistant Examiner*—Raymond J. Bayerl
*Attorney, Agent, or Firm*—Robert D. Marshall, Jr.; James C. Kesterson; Richard L. Donaldson

[57] ABSTRACT

A circuit controls the reordering of data as it is transferred to control a memory. The data to be reordered is presented such that the ordinate bit position within a data word is uniquely associated with a particular input to a data bus. The bus inputs, however, are connected to the VRAM in an arrangement contrary to the desired ordinate association with the compressed data word. A single swizzle logic circuit operates to allow graphic compressed data to be reordered for presentation to the block-write inputs of a VRAM regardless of the VRAM or pixel size. The circuit relies upon properly expanding the compressed data prior to the actual reordering of the ordinate positions of the data bits. A method for controlling the reordering of data also is described.

14 Claims, 7 Drawing Sheets

FIG. 6

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 7 | 7 | 7 | 7 | 6 | 6 | 6 | 6 | 5 | 5 | 5 | 5 | 4 | 4 | 4 | 4 | 3 | 3 | 3 | 3 | 2 | 2 | 2 | 2 | 1 | 1 | 1 | 1 | 0 | 0 | 0 | 0 |

SWIZZLE CORESPONDENCE

| INPUT | OUTPUT |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 1 |
| 9 | 5 |
| 10 | 9 |
| 11 | 13 |
| 12 | 17 |
| 13 | 21 |
| 14 | 25 |
| 15 | 29 |
| 16 | 2 |
| 17 | 6 |
| 18 | 10 |
| 19 | 14 |
| 20 | 18 |
| 21 | 22 |
| 22 | 26 |
| 23 | 30 |
| 24 | 3 |
| 25 | 7 |
| 26 | 11 |
| 27 | 15 |
| 28 | 19 |
| 29 | 23 |
| 30 | 27 |
| 31 | 31 |

FIG. 7

VIDEO GRAPHICS DISPLAY MEMORY SWIZZLE LOGIC AND EXPANSION CIRCUIT AND METHOD

TECHNICAL FIELD OF THE INVENTION

This invention relates to block-writing graphic control data and more particularly to an arrangement which allows for the expansion and reordering of data in an economical manner prior to controlling the block-write function.

CROSS REFERENCE TO RELATED APPLICATIONS

All of the following patent applications are cross-referenced to one another, and all have been assigned to Texas Instruments Incorporated. These applications have been concurrently filed and are hereby incorporated in this patent application by reference.

| Application Ser. No. | Title |
|---|---|
| 387,568 | Video Graphics Display Memory Swizzle Logic and Expansion Circuit and Method |
| 398,398 | Video Graphics Display Memory Swizzle Logic Circuit and Method |
| 387,459 | Graphics Floating Point Coprocessor Having Matrix Capabilities, now U.S. Pat. No. 5,025,407 |
| 339,957 | Graphics Processor Tapezoidal Fill Instruction Method and Apparatus |
| 826,291 | Graphic Processor Three-Operand Pixel Transfer Method and Apparatus |
| 387,199 | Graphics Processor Plane Mask Mode Method and Apparatus, now abandoned |
| 386,936 | Dynamically Adaptable Memory Controller For Various Size Memories |
| 387,472 | Graphics Processor Having a Floating Point Coprocessor, now abandoned |
| 387,553 | Register Write Bit Protection Apparatus and Method, now U.S. Pat No. 5,161,122 |
| 387,569 | Graphics Display Split-Serial Registor System, now abandoned |
| 387,455 | Multiprocessing Multiple Priority Bus Request Apparatus and Method, now abandoned |
| 387,325 | Processing System Using Dynamic Selection of Big and Little Endian Coding, now abandoned |
| 735,203 | Graphics Processor Nonconfined Address Calculation System |
| 386,850 | Real Time and Slow Memory Access Mixed Bus Usage, now abandoned |
| 387,479 | Graphics Coprocessor Having Imaging Capability, now abandoned |
| 387,255 | Graphics Floating Point Coprocessor Having Stand-Alone Graphics Capability, now abandoned |
| 713,543 | Graphics Floating Point Coprocessor Having Vector Mathematics Capability |
| 386,847 | Improvements in or Relating to Read-Only Memory, now U.S. Pat. No. 5,079,742 |
| 387,266 | Method and Apparatus for Indicating When a Total in a Counter Reaches a Given Number, now U.S. Pat. No. 5,060,244 |

BACKGROUND OF THE INVENTION

Microprocessors intended for graphics applications must be able to move pixel information between memory bit maps as quickly as possible. In situations where many pixels must be transferred to a bit map, the transfer may be speeded up by using a block-write feature. Typically, a block-write is created by associating a color register with each VRAM, filling the color register with bits to determine the desired color value of selected portions of the VRAM, and then using both the address bits of the VRAM as well as the data bus input to the VRAM to determine the locations within the VRAM where the color represented by the value in the color register will appear. This technique does not burden the data bus with multiple copies of the same pixel value and thus increases the available memory bandwidth, again speeding up data transfers.

The simplest application where the block-write can be used to advantage is the fill, which transfers the same pixel value into a defined area of memory. Also, some forms of data expansion are well suited to the application of block-write techniques. Thus, when a bit map is stored in compressed form the 1's and 0's can represent the presence or absence of a pixel and block-writes can be used to decompress the bit map. Typically, this sort of expansion is applied to character fonts which are often stored in compressed form to save memory.

Problems arise because memory accesses must be made in regular mode and in block-write mode via the same bus and they must be consistent such that data written (or read) in one mode must be able to be read (or written) in the other mode. This is a problem, since before data can be written to VRAMs in block-write mode, the bit order of the compressed representation of the data must be manipulated or swizzled relative to the regular mode access. This bit order change is necessary because typically the compressed data is stored with one bit representing each multibit display pixel in a specific order. The storage of these bits is serial with each bit representing a corresponding display point. For example, the first bit (bit 0) would represent pixel position one. The second bit (bit 1) would represent pixel position two and the third bit (bit 2) would represent pixel position three. Thus, the bits on the bus represent the pixel positions one for one, such that bus bit position zero would contain data for the first pixel while bus position three would contain data for the fourth pixel. However, because of the physical arrangement of the VRAMs where successive pixels are stored in different VRAM chips (or Units), the data must be reordered before presentation to the VRAMs. Consider the case where the VRAMs are four bits wide (four planes), the 32 bit bus would have bus positions 0–3 connected to the first VRAM which in turn can control bits 0–3 of the first pixel in a normal write situation. Thus, following this logic, compressed data in bus bit position 1 (the second position) which should be destined to control the second pixel will, in reality, unless something is done, end up being communicated to the second input of the first VRAM, which is associated with the ninth pixel and not the required second pixel. Thus, a bit order rearrangement is necessary when functioning in the block-write mode.

A further problem is encountered since the nature of a data swizzle appears to depend on the size of the pixel. Thus, on first viewing it appears that several different swizzle circuits must be available to accommodate a broad range of pixel sizes and VRAM configurations. However, this imposes severe hardware constraints on the system in terms of wasted chip area or proliferation of external multiplex logic.

Accordingly, a need exists in the art for a swizzle arrangement which allows for the efficient manipulation of data so as to accomplish block-writes in an economical manner.

A further need exists in the art for such a circuit which can be used for any size pixel or VRAM configuration.

SUMMARY OF THE INVENTION

There is designed a universal swizzle arrangement which can be utilized for many different size pixels provided that the data undergoes expansion prior to the swizzle operation. This circuit takes advantage of the recognition that the need for swizzling occurs because during the block-write the bits of the data stream directed at the VRAMs are accessing different pixel locations than they would be under normal write conditions. This difference can be thought of as a reordering in the bit stream caused by the fact, as discussed above, that each VRAM handles one pixel (or a part of one pixel) with the pixel having four (or more) bits.

Assuming that each pixel has four bits, and assuming that each VRAM has four data input paths (one for each bit of the pixel) there would be a separation, or reordering, of four bit positions between the compressed data and the actual input to the VRAMs. This reordering is performed by a swizzle circuit.

Thus compressed bus bit 0 goes to post swizzle position 0, while compressed bus bit 1 goes to post swizzle position 4. Likewise, compressed bus bit 2 goes to post swizzle position 8 and compressed bus bit 3 goes to post swizzle position 12. This continues for 7 compressed bit positions with compressed bit 7 going to post swizzle position 28. The next compressed bit, bit 8, goes to post-swizzle position 1, while compressed bit 9 goes to post-swizzle position 5. This discontinuous sequence continues for the full bus width.

In the situation where the pixel size is 8 bits, two four bit wide VRAMs would be required, each holding one-half of the eight bit pixel. In this situation, then, the expansion requires a different algorithm, namely the reordering of the ordinate position of the compressed bits by 8 positions. However, it is possible to use the exact same swizzle circuit for several different pixel sizes provided only that the ordinate position of the compressed data is first altered so that each ordinate position corresponds to the VRAM position(s) to which it is to be directed. This ordinate position adjustment is called expansion. It is recognized that all VRAMs comprising the same pixel must be provided the same identical control signal. Thus, for a 2 VRAM pixel (for example, 8 bits) two positions of the bus must reflect the same compressed bit value.

Accordingly, the compressed bit in bus position 0 must also be duplicated into bus position 1. Likewise, compressed bit 1 would be duplicated into bit positions 2 and 3. Once this is accomplished, the same swizzle circuit as before can be applied to the duplicated expanded bits. The expansion parameter is a direct function of the pixel size.

The expansion before the swizzle can take place in special logic built into the processor, or the expansion could take place within a processor followed by a swizzle implemented in external logic, and the expansion and the swizzle could be performed outside the processor.

It is a technical advantage of this invention that a single swizzle transformation can be used for differing pixel sizes and differing memory architectures providing the data is first expanded and duplicated according to a given expansion logic.

BRIEF DESCRIPTION OF THE DRAWINGS

For a more complete understanding of the present invention and further advantages thereof, reference is now made to the following Detailed Description, taken in conjunction with the accompanying Drawings, in which:

FIG. 6 shows a four position expansion;

FIG. 7 shows the swizzle circuit cross-connections for all situations; and

DETAILED DESCRIPTION OF THE INVENTION

Figure 1:
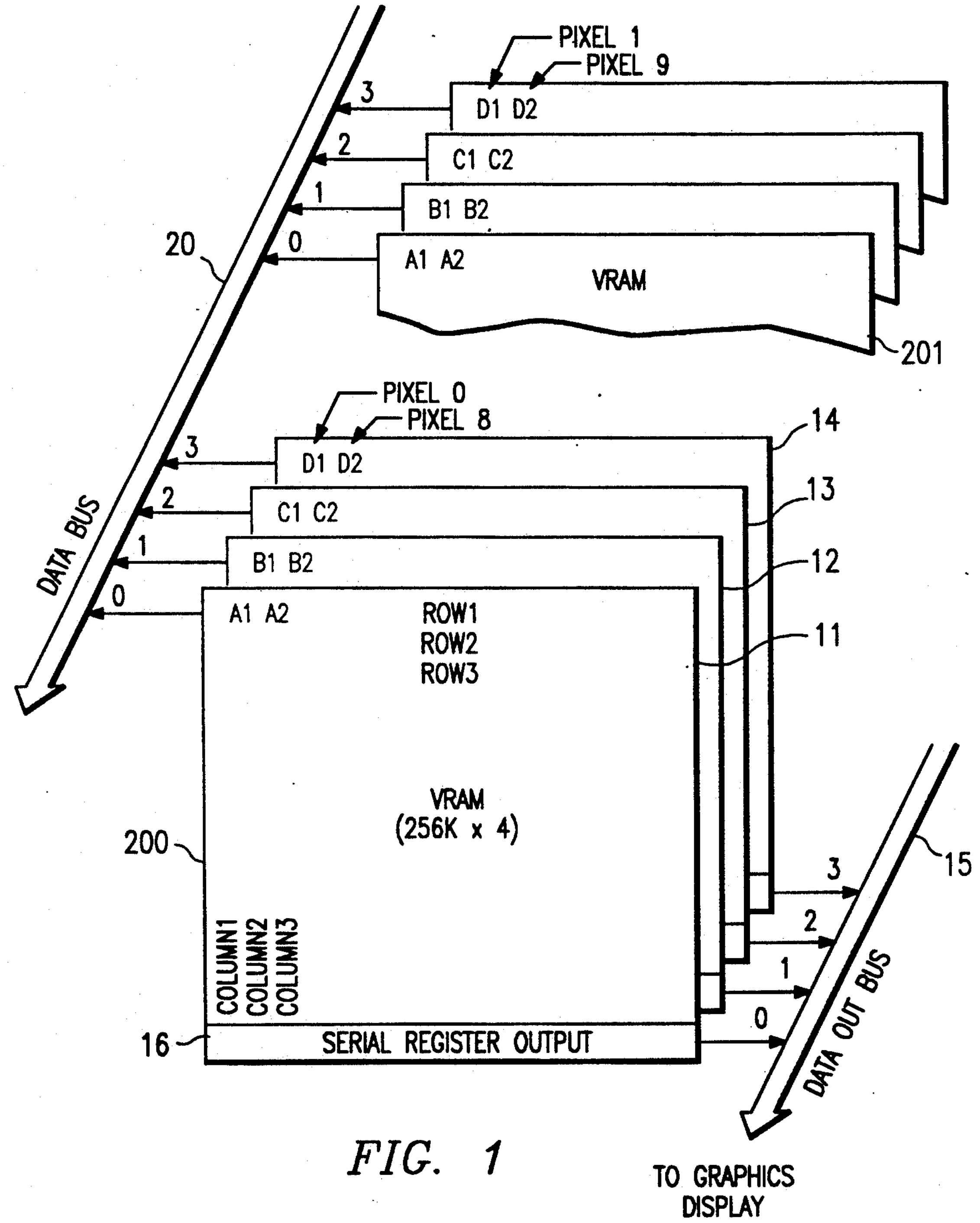
FIG. 1 shows a stylized view of a VRAM memory.

Turning now to FIG. 1, a brief discussion of the memory structure of a typical graphics memory system is in order before progressing to the actual detailed description of the functioning of the embodiment of this invention. While there are many memory structures and system which could be used, it has been typical to use a structure, such as shown in FIG. 1, which uses eight VRAM memories 200, 201, etc. in an array. Each VRAM memory, or unit, having four sections, or planes, 11, 12, 13 and 14. The construction of each plane is such that a single data lead is used to write information to that plane. These leads are labeled 0, 1, 2, and 3 for each plane. In a system that uses a 32 bit data bus, such as data bus 20, there would be 8 VRAM memories (two of which are shown in FIG. 1) each memory having four data leads connected to the data bus.

Figure 2:
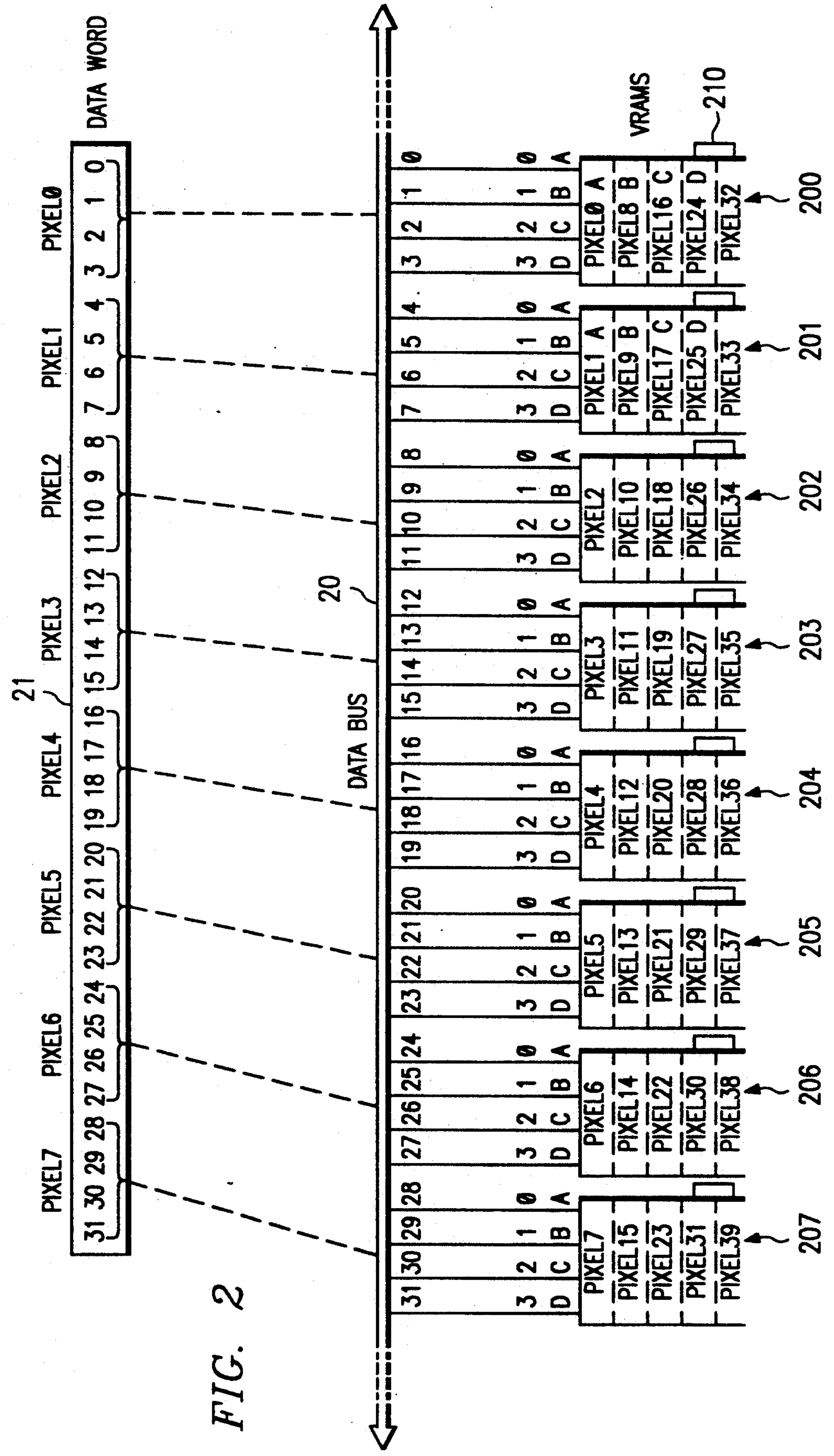
FIG. 2 shows a VRAM memory connection to a data bus.

Thus, for a 32 bit data bus VRAM memory 200 Would have its four data- leads connected to data bus leads 0, 1, 2, 3, respectively. Likewise, VRAM memory 201 would have its four leads 0, 1, 2, 3 connected to data bus leads 4, 5, 6, 7, respectively. This continues for the remaining six VRAMs such that the last VRAM has its leads connected to leads 28, 29, 30, 31 of bus 20. The full set of connections is shown in FIG. 2.

Continuing with FIG. 1, the memories are arranged such that the pixel information for the graphics display is stored serially across the planes in the same row. Assuming a four bit per pixel system, then successive pixels are stored in successive VRAMs. In such a situation pixel 0 would be in VRAM 200, and pixel 1 would be in VRAM 201. The pixel storage for pixels 2 through 7 are not shown in FIG. 1 but are shown in FIG. 2. The pixel information for pixel 8 then would be stored in VRAM 200, still in row 1 but in column 2 thereof. The reason for this arrangement of pixel information will be more fully appreciated from an understanding of how information is retrieved from the memory.

Continuing with FIG. 1, each VRAM plane has a serial register 16 for shifting out information from a row of memory. The outputs from these registers are connected to data out bus 15 in the same manner as the data input leads are connected to the data input bus. Thus, data from a row of memory, say row 1, would be moved into register 16. This would occur for each plane of the eight memory array.

Looking at data output bus 15 then at an instant of time the first bit in each shift register would be on the bus. Thus assuming row 1 was being outputted to the bus, the bus would have on its lead 0 the row 1 bit Al of memory 200. Output bus 15 lead 1 would have on it row 1 bit B1, while lead 2 would have row 1 bit C1 and lead 3 would have on it row 1 bit D1. These bits would be followed by memory 201 row 1 bits, A1, B1, C1, D1 on leads 4, 5, 6, 7, respectively. Thus, at a first instant of time, data out bus 15 would have on it the four bits forming pixel 0 followed by the four bits forming pixel 1, followed by the four bits forming pixel 2. This would continue until the 32 bits forming the 8 pixels 0–7 were on the consecutive leads of data out bus 15. These bits would be supplied to the graphics display and the shift registers would all shift one position providing the bus with pixel information for the next 8 pixels, namely pixels 8 through 15. This shifting would then continue until the entire line was shifted out and then a new line would be selected for loading into the output register. A more complete discussion with respect to the shifting out of data from a VRAM is contained in the concurrently filed patent application entitled GRAPHICS DISPLAY SPLIT SERIAL REGISTER SYSTEM, serial number 387,569, now abandoned, which application is incorporated herein by reference. For a more detailed description of the operation of a VRAM and its block-write mode, see U.S. Pat. No. 4,807,189, issued Feb. 21, 1989, which patent is hereby incorporated by reference herein.

Up to this point we have assumed that the bit information per pixel is 4 bits. If the pixel information were to be, say 8 bits, then two 4 bit wide VRAMs would have to be used for each pixel. This would change the bit patterns somewhat. This aspect of the invention will be discussed in further detail hereinafter. Also, it should be noted that memory sizes and structures continue to vary and the size and structure shown are only for illustrative purposes and this invention can be used with many different memory configurations and with different pixel sizes.

It must be noted that the depiction of memory in FIGS. 2 through 5 is a one-dimensional representation of what is conceptually a three-dimensional array as shown in FIG. 1. Therefore, from this point on, the term "row" refers to the set of pixels addressed at any one time from the bus.

Turning now to FIG. 2, a full eight VRAM memory arrangement is shown with the information for controlling pixels 0–7 contained in the top row of VRAMs 200 through 207, while pixels 8 through 15 are in row 2, and pixels 16 through 23 are in row 3, and pixels 24 through 31 are in row 4. This arrangement continues for each additional row of memory.

For normal write operations to the VRAM memory, bits of data are received over data bus 20. The position of the information on the bus determines where the data is to be stored in the VRAMs. Thus, a bit on lead 0 of bus 20 goes onto lead 0 of VRAM 200. Assuming the address location of the first row of VRAM 200 has also been selected, that bit information would become associated with bit 0 of pixel 0. This is the well known traditional operation of graphics systems and details of this operation will not be undertaken here. It is sufficient for our understanding of this invention to note that a given data word, such as data word 21, has bits in ordinate position and these bits will be transferred directly to the proper bit positions within the VRAMs because of the physical connections and associations between the data bus and the VRAMs. Also note that information in ordinate positions 0–3 of data word 21 can go, via bus 20, to one of many pixels 0, 8, 16, 24, 32, etc. The actual storage location will depend upon other concurrent addressing to the VRAMs, all of which is not shown here but is well known in the art.

The method of presentation of data as described above requires 32 bits of data, and a full memory write cycle for each row (8 pixels). In some situations, for example, when a background color is to be painted on a screen, many pixels will have the same information written to them. The block-write method of loading a VRAM has been devised to handle this situation. This operation, which is well known in the art, uses a special register on each VRAM, such as register 210 shown in conjunction with VRAM 200, which contains bits for transfer to selected pixel locations within memory. These bits are loaded prior to the start of any block-write operation.

During the block-write operation the memory is loaded in a manner different from normal loading. The four data input leads are used, but this time each bit controls the transfer of the special register bits to a particular memory row in that VRAM. For example, in VRAM 200 assume it is desired to load pixels 0, 8 and 24 with the bits from register 210 while leaving pixel 16 unchanged. In this situation, leads 0, 1, 3 would have logical 1's thereon while lead 2 would contain a logical 0. This same situation would prevail for the entire 32 bit bus in that the ordinate position of the bits would determine whether or not information is to be transferred into a corresponding pixel in a corresponding VRAM memory row. This, it will be appreciated, is different from the normal loading of data where the data itself comes from the data bus. For block-write operations, the data comes from the special registers associated with each VRAM and the bits on the data bus merely give on-off or load not load instructions depending upon their position on the various leads of the bus.

The data word that controls this operation is then said to be in compressed format such that the ordinate position of each bit being either a 1 or 0 controls a function. Also it should be noted that 1 and 0 representing on and off, respectively, is merely illustrative and the reverse may be true also.

Figure 3:
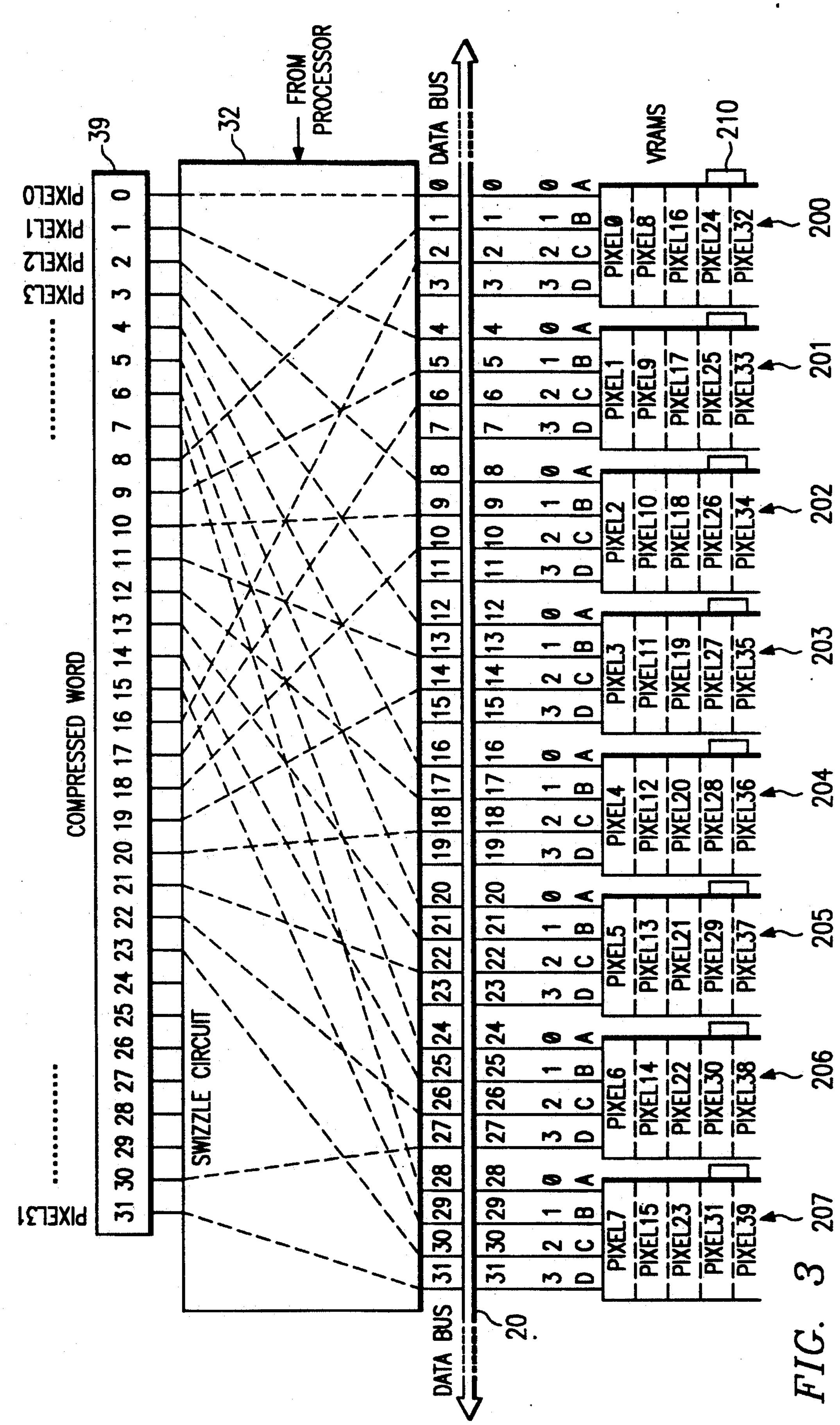
FIG. 3 shows a swizzle circuit connected to the data bus.
Figure 4:
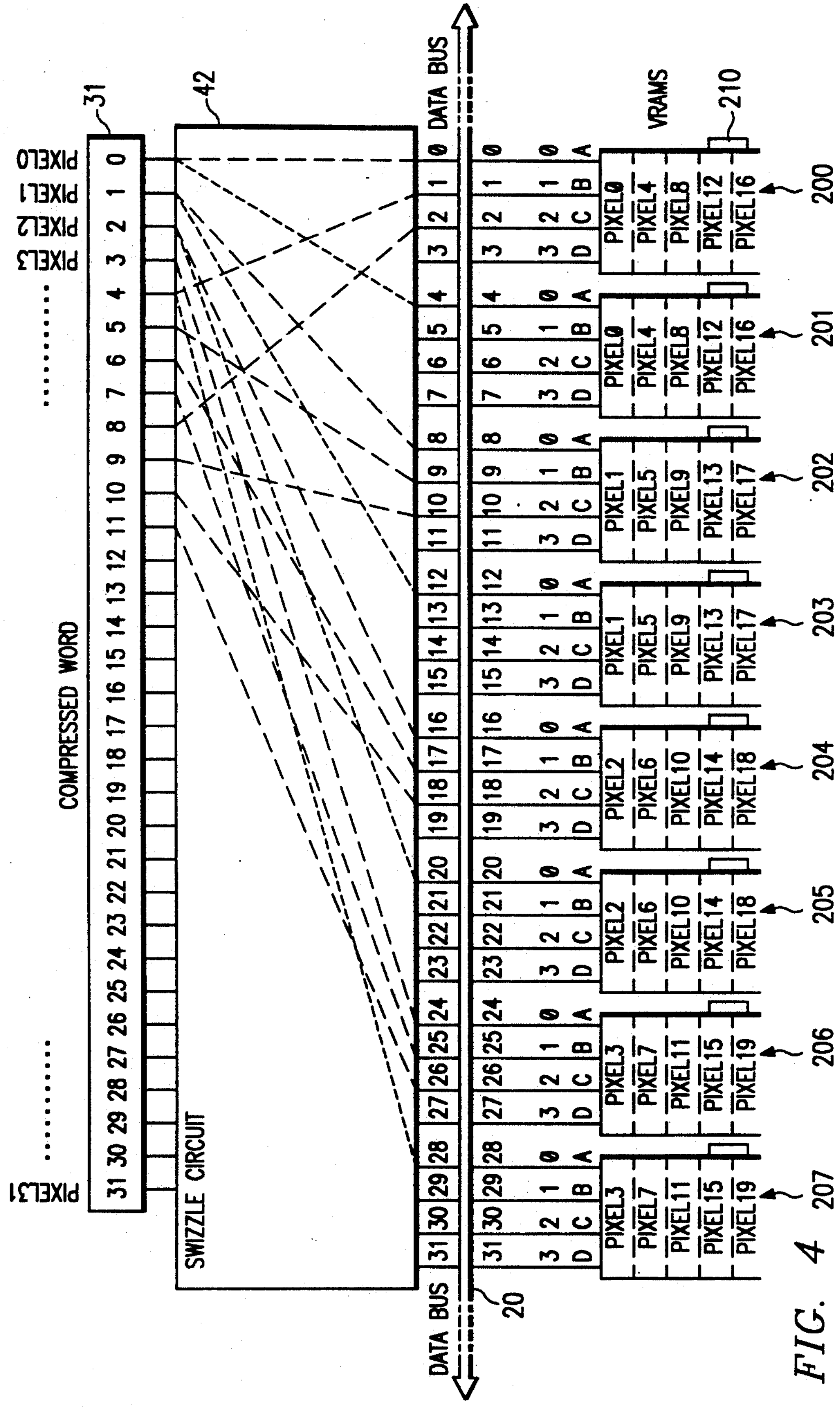
FIGS. 4 and 5 show partial connections for alternate swizzle circuits.

Turning now to FIG. 3, it will be seen that compressed data word 31 has ordinate positions 0–31 which must be presented to the VRAMs to control various pixels in accordance with the ordinate position of the data in the word. Thus, pixel 0 is to be controlled by compressed data bit 0, while pixel 1 is to be controlled by compressed data bit 1. In this manner, compressed data bit 31 should then control pixel 31 This is easier said than done.

Pixel 0 is easy since it is controlled by lead 0 of VRAM 200 which is connected to compressed bit 0. However, the bit in position 1 of compressed data word 39 begins the problem. In FIG. 2 this non-compressed bit is connected to pin 1 of VRAM 200. However, as discussed above, the bit in compressed data ordinate position 1 is used to control the writing of information from the special register into pixel 1. Pixel 1 is controlled, in turn, by a 1 or 0 on lead 1 of VRAM 201. This lead, in turn, is connected to lead 4 of bus 20. A comparison of FIGS. 2 and 3 will show that in one situation bit position 1 of the input data word goes to lead 1 of bus 20 while in the other situation it goes to lead 4. Thus, clearly a reordering of bits is necessary when compressed words are used to control data transfer in the block-write mode.

This reordering is accomplished by swizzle circuit 32 which is interposed between the compressed data input and the actual data bus. Swizzle circuit 32 is controlled by the processor to allow data to flow straight through, as would be the situation for FIG. 2, or to reorder the leads in a certain pattern as is required for FIG. 3. This arrangement does not require processor time to continue to rearrange information, but rather establishes a pattern based on the physical structure of the memory bus arrangement and calls upon that structure whenever a block-write operation is invoked.

The swizzle circuit could be hard wired or could be software controlled within or outside of the processor.

Now let us assume that instead of four bits per pixel it is desired to use eight bits per pixel. Also let us assume that we continue using VRAMs having four planes per unit as discussed with respect to FIG. 1. In such a situation the reordering of the bits from the compressed word would be different than it was when only four bits per pixel were used. This can easily be seen in FIG. 4 where VRAMSs 200 and 201 now both contain pixel 0 information, while VRAMs 202,203 contain pixel 1 information.

It follows then that while again compressed data bit 0 continues to be associated with lead 0 of VRAM 200, all the other ordinate positions of the compressed word are associated with different leads of the bus. Take for example compressed word ordinate position 2. In FIG. 3, compressed data word ordinate position 2 is associated with pixel 2 and bus lead 8. However, in FIG. 4, the association is with bus lead 16. This then argues for separate swizzle circuits for systems where there is different pixel configurations. Also, since half of each pixel is contained in a separate VRAM, both halves are controlled by the same compressed data control bit. Thus, each compressed data control bit must be duplicated once for each additional VRAM which contains part of a given pixel. This also argues for separate swizzle circuits for each pixel configuration.

Figure 5:
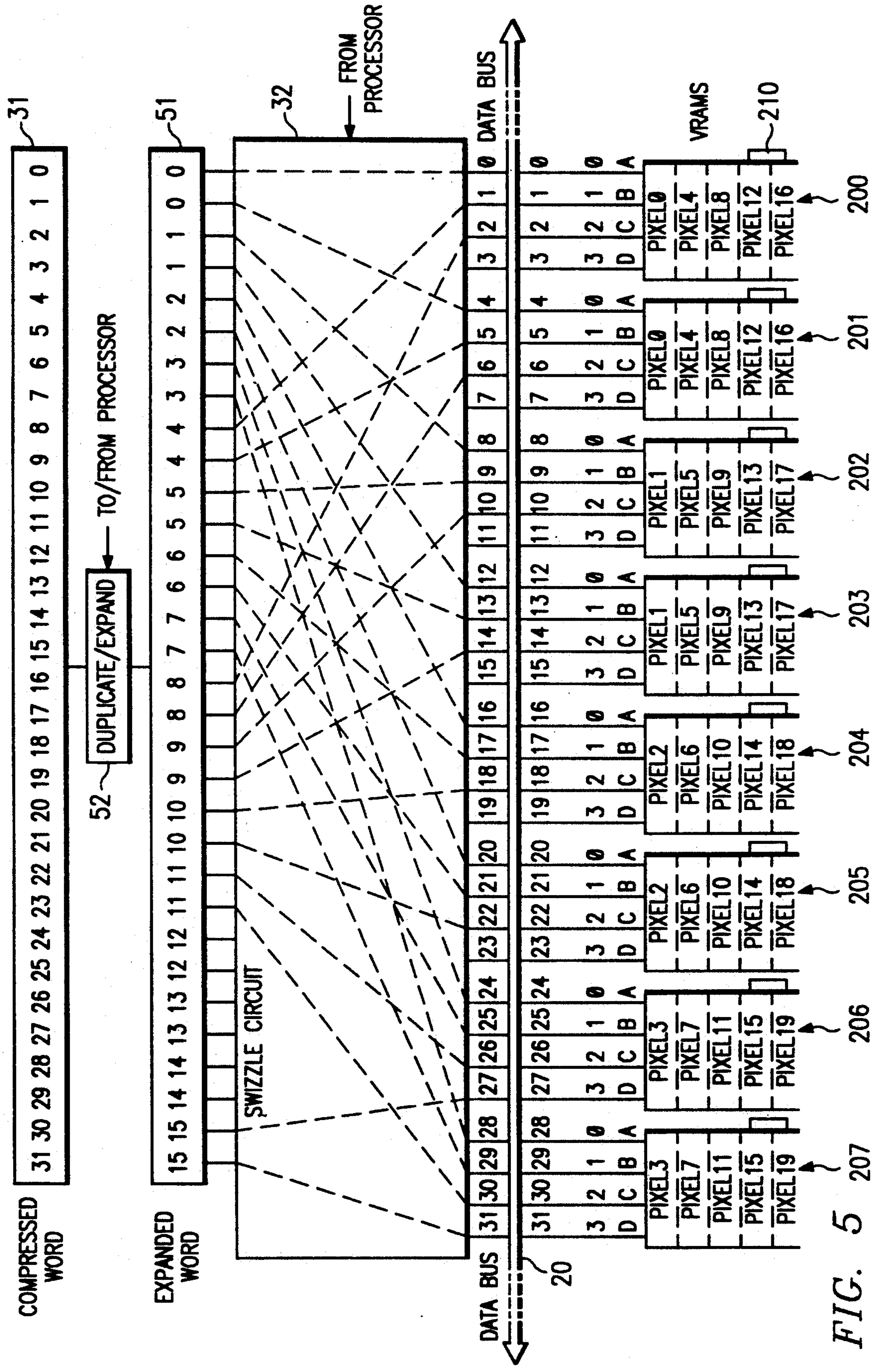

Turning to FIG. 5, it is seen that expanding the compressed word by duplicating each bit corresponding to the number of VRAMs used per pixel will result in the ability to use the same swizzle circuit for different memory/pixel configurations. This solution, as performed by duplicating/expansion circuit 52 has the effect of also activating both VRAMs of a given pixel, since the color information must be provided to all pixel bits even when these bits are positioned within two VRAMs.

The essence of the operation is the fact that the duplication and expansion occurs prior to the swizzle operation, thereby allowing the same swizzle configuration for both operations. In typical operations the same configuration would be used for any given system and thus only one determination of duplication/expansion need be made. However, situations may arise where more than one VRAM system configuration is controlled by the same processor, and thus dynamic control can be required. This can easily be achieved by arranging duplicate/expansion circuit 52 to function under control of the system processor on a case by case basis.

Duplicate/expansion circuit 52 can be any type of register circuit or processor that can reorder and pad numbers. This can be operated by microcode under control of the main processor or by a special processor or can be performed by a host processor if desired. The function performed by circuit 52 is mathmatical in nature and thus one skilled in the art can easily devise many arrangements to perform the desired function.

Circuit 52 can be system adaptable to change the duplicating and expansion function on a dynamic basis in response to received data or in response to a flag in a register to allow for changing pixel/memory configurations. Thus, for a pixel size of 16 bits and a VRAM of the same size as shown in FIG. 1, namely four bits, four VRAMs would be used for each pixel and thus the expansion would be by four bits. In this situation, as shown in FIG. 6, expanded word 61 would have the data from compressed bit ordinate position 0 expanded into ordinate positions 0, 1, 2, 3 of the expanded word. In this situation the data from compressed ordinate position 1 would be expanded into ordinate bit positions 4, 5, 6, 7, and so forth.

It can be seen from the chart in FIG. 7 that the duplicated data at the inputs 0, 1, 2, 3 of the swizzle circuit go to outputs 0, 4, 8, 12. From FIG. 4 it can be seen that these outputs go to VRAMs 200,201,202,203 which are the four VRAMs which would hold pixel 0 if that pixel were to be 16 bits long.

The compressed word is provided in a register such that it can be rotated through all 32 bits for any given memory clock cycle regardless of how many bits are expanded. This allows for continuous system operation without regard to pixel size. This also allows for total flexibility of memory storage to allow for starting and stopping at any given pixel boundary.

Figure 8:
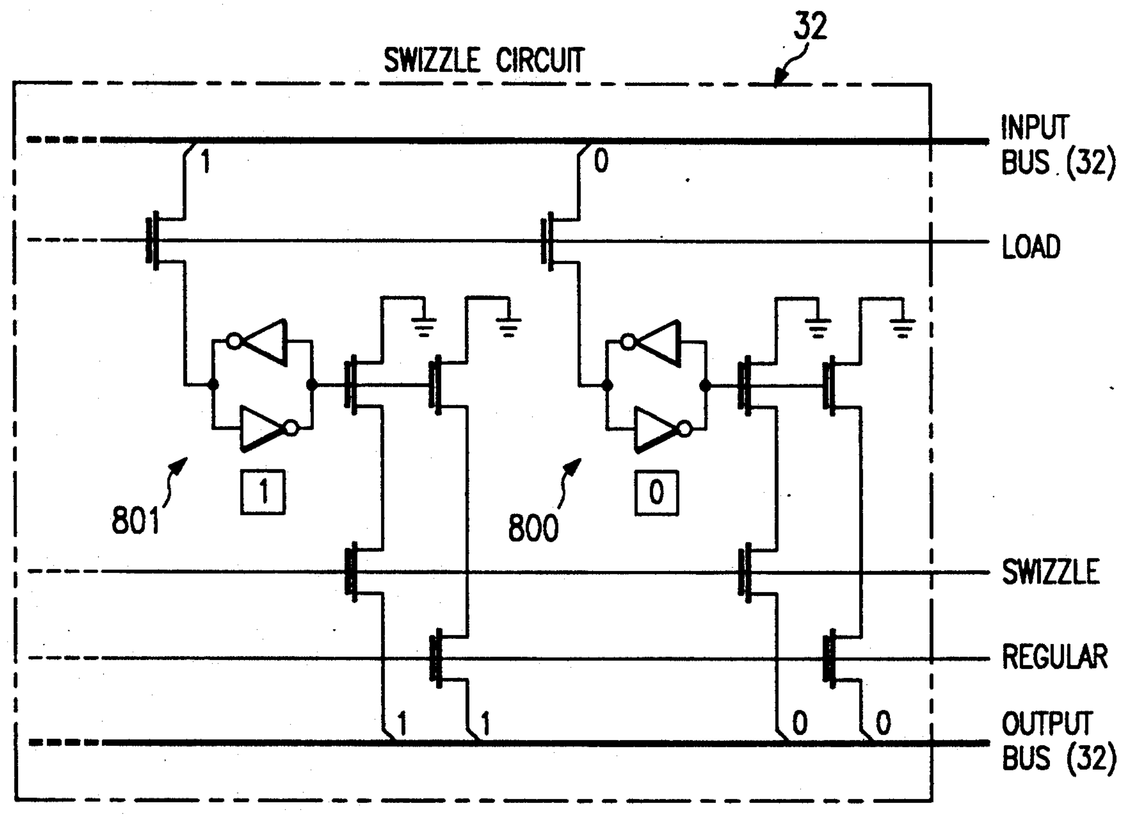
FIG. 8 shows one embodiment of a swizzle circuit.

FIG. 7 shows the input to output correspondence of swizzle circuit 32 when the swizzle circuit is in the swizzle mode. It should be realized that each input has two possible outputs: the swizzle output, as shown, and the straight-through output, which is not shown. Of course, the straight-through output has input 0 connected to output 0, with input 1 connected to output 1, input 2 connected to output 2, and so forth. A switching circuit is used to switch between the straight-through arrangement of the swizzle circuit and the swizzle mode of the swizzle circuit. FIG. 8 shows one embodiment of the swizzle circuit 32 where registers 0 and 1 are shown for positions 0 and 1.

As shown in FIG. 8, the input bus has 32 leads, and the output bus also has 32 leads. Between these leads are a number of latches, two of which, 800, 801, are shown. Each latch has a single input connected to an individual input bus lead and two outputs connected to the straight-through correspondence and to the swizzle correspondence in accordance with FIG. 7. The latches load in a straightforward manner from information on the input bus upon the signal provided on the load lead. For the straight-through operation, a signal is provided on the REGULAR lead, and the outputs from the latches are clocked straight through the swizzle circuit with straight-through correspondence, as noted above. However, when swizzle circuit 32 is being utilized in the swizzle mode, the SWIZZLE lead is pulsed, and this serves to switch the outputs. For example, with respect to latch 801, in the straight-through mode, latch 801 is connected to lead 1 of the output bus. However, in the swizzle mode, as can be seen, another output from latch 1 is connected to lead 4 of the output bus. All of the latches of swizzle circuit 32 are wired with this correspondence such that the swizzle output lead of each latch is connected as shown in FIG. 7 to the output bus lead. This arrangement allows for the selective control of swizzle circuit 32 in the straight-through mode or the swizzle mode, under control of the system processor.

While the circuit and method shown here has been described in terms of the block-write operation of a graphics processing system it can be used in numerous other situations where ordinate coordination is required for controlling physical adaptations. It should be noted that the circuitry including the swizzle circuit and processor could be integrated into a single chip.

Although the present invention has been described with respect to a specific preferred embodiment thereof, various changes and modifications may be suggested by one skilled in the art, and it is intended that the present invention encompass such changes and modifications as fall within the scope of the appended claims.

What is claimed is:

1. A system for adjusting bit positions of control data before presenting said control data to a memory bank including a plurality of planes of memory for storing fields of data, wherein each said field of data is associated with N inputs to said memory bank, said control data arriving on an input bus in ordinate positions that correspond on a one for one basis with said planes of memory, said planes of memory each being connected to a data bus in numerical order, said system comprising:

reordering circuitry for reordering said bits of control data from said ordinate positions on said input bus to different ordinate positions on said data bus for application to said planes of memory, said reordering circuitry being a swizzle circuit having a plurality of inputs connected to said input bus and a like plurality of outputs connected to said planes of memory, said swizzle circuit comprising:

a like plurality of latches, each latch controlling one input and one or more outputs; and circuitry for controlling which output any input is connected with at any instant of time; and expansion circuitry, operative prior to presentation of said control data to said reordering circuitry, for duplicating said control data from ordinate positions of said input bus N times and applying the duplicated control data through said reordering circuitry to said planes of memory.

2. A system for adjusting the bit position of certain data input bits onto a data bus connected to a graphics memory comprising a number of VRAMs during a block-write operation of said graphics memory system, said block-write operation characterized by establishing with respect to each VRAM a color register having color bits representative of a color to be written to selective pixel locations represented at address locations within said VRAM, said VRAM having a number of planes, each plane having one data input lead and where a number of said planes operate together to control one pixel, said address selection occurring as a joint selection via the normal address leads of said VRAM and a 1 or 0 data bit on said data input leads of each plane of said VRAM such that each data input lead controls a different pixel, said data input leads connected to said data bus sequentially pixel by pixel.

said data input bits arriving such that the ordinate position of each said bit is operable for presentation of a 1 or 0 to said pixels in like ordinate order, said system comprising;

expansion circuitry for duplicating all said data input bits a number of times dependent upon the number of said VRAMs used for the control of said pixels, said expansion circuitry operating to expand said data input bits by adding said duplicated data bits in higher ordinate positions from the original data bits; and logic circuitry for reordering said bits after expansion for presentation to control said block-write operation.

3. A system as set forth in claim 2, wherein said logic circuitry is a swizzle circuit having a plurality of inputs and a like plurality of outputs, said swizzle circuit comprising:

a like plurality of latches, each latch controlling one input connected to said expansion circuitry and one or more outputs connected to said planes; and circuitry for controlling which output any input is connected with at any instant of time.

4. The system set forth in claim 2 further including circuitry for determining the number of said VRAMs containing the same pixel information and for controlling said expansion circuitry in accordance with said determination.

5. The system set forth in claim 2 wherein said expansion circuitry is arranged for controlling the expansion when said graphics memory is configured with any number of VRAMs controlling said pixels.

6. A circuit for reordering the bit positions of a compressed data word for presenting said bits of said compressed data word to individual data leads of a data bus having b data leads therein, said presentation being in a plurality of modes and said presentation including the presentation of b data bits to said data but during any one memory write cycle, the circuit comprising:

presentation registers for holding in sequence said data bits of said compressed data word for presentation to finite inputs of a series of memories, each memory having individual memory units, each memory unit having n data inputs, each data input connected in sequence to said b data leads of said data bus;

such that in a first mode presentation, the memory units function as distinct memories when the ordinate positions of the first b/n data bits in said presentation register are associated with a first data input of each of said memories, the ordinate positions of the second b/n data bits in said presentation register are associated with a second data input of each of said memories, the ordinate position of the third b/n data bits in said presentation register are associated with a third data input of each of said memories, and the ordinate positions of the fourth b/n data bits in said presentation register are associated with a fourth data input of each of said memories;

such that in a second mode presentation, said memory units function as pairs wherein the ordinate positions of the first (b/n)2 data bits in said presentation register are associated with the first data input of each of said memory pairs, the ordinate positions of the second (b/n)2 data bits in said presentation register are associated with the second data input of each of said memory pairs, the ordinate positions of the third (b/n)2 data bits in said presentation register are associated with the third data input of each of said memory pairs, and the ordinate position of the fourth (b/n)2 data bits in said presentation register are associated with the fourth input of each of said memory pairs, and wherein said circuit further comprises:

expansion circuitry for duplicating in said presentation register the data bit from any ordinate position of said b data bits compressed data word into the next ordinate position in said presentation register when said memories are in said second mode; and reordering circuitry common to both said first and second modes for rearranging said data bits of said word in said presentation register during presentation of said data bits to said b data bus connections so as to effectuate said associations.

7. The circuit set forth in claim 6 wherein said circuit further includes circuitry for shifting said data bits of said compressed word when said memories are in said second mode so that b data bits cycle through said presentation registers.

8. The circuit set forth in claim 6 further including circuitry for determining the mode of said memories and for controlling said expansion circuitry in accordance with said determination.

9. The circuit set forth in claim 6 wherein said expansion circuitry is arranged for controlling the expansion when said memory units function together as multiple pairs.

10. The circuit set forth in claim 6 wherein said reordering circuitry is a swizzle circuit having a plurality of inputs and a like plurality of outputs, said swizzle circuit comprising:

a like plurality of latches, each latch controlling one input connected to said expansion circuitry and one or more outputs connected to said memory units; and circuitry for controlling which output any input is connected with at any instant of time.

11. A method of reordering the bit positions of a compressed data word for presenting said bits of said data word to individual data leads to a data bus having b data leads therein, said presentation being in one of a plurality of modes and said presentation including the presentation of b data bits to said data bus during any one memory write cycle, said method comprising the steps of:

holding in sequence said data bits of said compressed data word for presentation to finite inputs of a series of memories, each memory having individual memory units, each memory unit having n data inputs, each data input connected in sequence to said b data leads of said data bus;

such that in a first mode presentation, the memory units function as distinct memories wherein the ordinate positions of the first b/n data bits in said held sequence bits are associated with a first data input of each of said memories, the ordinate positions of the second b/n data bits in said held sequence bits are associated with a second data input of each of said memories, the ordinate positions of the third b/n data bits in said held sequence bits are associated with a third data input of each of said memories, and the ordinate positions of the fourth b/n data bits in said held sequence bits are associated with a fourth data input of each of said memories, such that in a second mode presentation, said memory units function as pairs of memories wherein the ordinate positions of the first (b/n)2 data bits in said held sequence bits are associated with the first data input of each of said memory pairs, the ordinate positions of the second (b/n)/2 data bits in said held sequence bits are associated with the second data input of each of said memory pairs, the ordinate positions of the third (b/n)2 data bits in said held sequence bits are associated with the third data input of each of said memory pairs, and the ordinate positions of the fourth (b/n)2 data bits in said held sequence bits are associated with the fourth data input of each of said memory pairs, and wherein said method further comprises the steps of:

duplicating the data from any ordinate position of said b bit sequentially held data into the next ordinate position in said held sequential data when said memories are in said second mode; and reordering said bits of said sequentially held bits during presentation of said bits to said b data bus connections so as to effectuate said associations, said reordering being the same for said first mode and for said second mode.

12. The method as set forth in claim 11 further comprising the step of dynamically determining which memory mode is being used for any memory cycle.

13. The method as set forth in claim 12 further comprising the step of adjusting said duplicating step in accordance with said dynamic determination.

14. The method as set forth in claim 11 wherein said duplicating step includes the steps of:

duplicating each bit of said compressed word a number of times depending upon the number of memory units functioning together; and expanding said held sequential data bits by adding said each set of duplicated bits in the next ordinate positions to the original data bits of said sequentially held data bits.

* * * * *